United States Patent
Lin et al.

(10) Patent No.: US 11,183,870 B2
(45) Date of Patent: Nov. 23, 2021

(54) ON-LINE UNINTERRUPTIBLE POWER SYSTEM AND OPERATION METHOD THEREOF

(71) Applicant: CYBER POWER SYSTEMS, INC., Taipei (TW)

(72) Inventors: Zi-Wei Lin, Taipei (TW); Chun-Chao Liao, Taipei (TW); Chao-Ching Yang, Taipei (TW); Hsun-Ping Cho, Taipei (TW); Hong-Jhih Chen, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 0 days.

(21) Appl. No.: 16/842,067

(22) Filed: Apr. 7, 2020

(65) Prior Publication Data

US 2021/0249897 A1 Aug. 12, 2021

(30) Foreign Application Priority Data

Feb. 6, 2020 (CN) .......................... 202010081382.0

(51) Int. Cl.
*H02J 9/06* (2006.01)
*H02J 7/02* (2016.01)
*H02M 1/42* (2007.01)

(52) U.S. Cl.
CPC ................ *H02J 9/062* (2013.01); *H02J 7/02* (2013.01); *H02J 9/068* (2020.01); *H02J 2207/20* (2020.01); *H02M 1/4208* (2013.01)

(58) Field of Classification Search
CPC .... H02J 9/062; H02J 9/068; H02J 7/02; H02J 2207/20; H02M 1/4208
See application file for complete search history.

(56) References Cited

U.S. PATENT DOCUMENTS

| | | | |
|---|---|---|---|
| 2006/0043797 A1* | 3/2006 | Hjort ..................... | H02J 7/0047 307/46 |
| 2016/0268839 A1* | 9/2016 | Mouridsen ............ | H02M 7/487 |
| 2017/0054383 A1* | 2/2017 | Mouridsen ............ | H02M 5/458 |
| 2018/0159343 A1* | 6/2018 | Chen ...................... | H02J 9/062 |
| 2019/0280346 A1* | 9/2019 | Liao ...................... | H01M 10/44 |

FOREIGN PATENT DOCUMENTS

| | | |
|---|---|---|
| CN | 103178582 B | 2/2016 |
| CN | 208767847 U | 4/2019 |
| TW | 201225473 A | 6/2012 |
| TW | M541146 U | 5/2017 |
| TW | 201939850 A | 10/2019 |

* cited by examiner

*Primary Examiner* — Jared Fureman
*Assistant Examiner* — Duc M Pham
(74) *Attorney, Agent, or Firm* — Bacon & Thomas, PLLC (57) ABSTRACT

An on-line uninterruptible power system and an operation method thereof are provided. The on-line uninterruptible power system comprises a first switch unit, a second switch unit, a charging circuit, a DC-AC conversion circuit, a power factor correction circuit and a control circuit. When the on-line uninterruptible power system is in a line mode, the control circuit controls the operation of the power factor correction circuit to limit the magnitude of its input current to not exceed a first predetermined value.

6 Claims, 6 Drawing Sheets

ON-LINE UNINTERRUPTIBLE POWER SYSTEM AND OPERATION METHOD THEREOF

BACKGROUND OF THE INVENTION

Field of the Invention

The present invention relates to the technical field of uninterruptible power systems, and in particular, to an on-line uninterruptible power system and an operation method thereof.

Description of Related Art

Circuit breakers are designed to protect you, your family, your home and your office. If a circuit breaker trips, it means there was too much current flowing through that particular circuit breaker. For example, a 15 Amp circuit breaker will trip when more than 15 Amps of current are flowing through it.

Once a circuit breaker trips, the power outlets associated with it will be powered down. This means that the electrical devices associated with these power outlets will be inoperable. For example, when these electrical devices (such as laser printers) are performing an important task (such as printing ballots) at the same time, the electrical devices printing ballots may draw high current instantaneously, and may consequently cause the circuit breaker trips. When these electrical devices are inoperable, the important task will be delayed or even impossible to complete.

SUMMARY OF THE INVENTION

An object of the present invention is to provide an on-line uninterruptible power system, which can be electrically coupled between a circuit breaker and at least an electrical device to prevent the circuit breaker from tripping.

Another object of the present invention is to provide an operation method of the aforementioned on-line uninterruptible power system.

To achieve the above object, the present invention provides an on-line uninterruptible power system. The on-line uninterruptible power system comprises a first switch unit, a second switch unit, a charging circuit, a DC-AC conversion circuit, a power factor correction circuit, and a control circuit. The first switch unit is electrically coupled to an AC power source and a terminal of a bypass path. The second switch unit is electrically coupled to an output terminal of the on-line uninterruptible power system and the other terminal of the bypass path. The charging circuit is electrically coupled to the AC power source and a battery. The DC-AC conversion circuit is electrically coupled between the battery and the second switch unit. The power factor correction circuit is electrically coupled between the first switch unit and the DC-AC conversion circuit. The control circuit is electrically coupled to the first switch unit, the second switch unit, the power factor correction circuit, the DC-AC conversion circuit and the charging circuit. When the on-line uninterruptible power system is in a line mode, the control circuit controls the operation of the power factor correction circuit to limit the magnitude of its input current to not exceed a first predetermined value.

To achieve the above object, the present invention provides an operation method of an on-line uninterruptible power system, which comprises the following steps: determining whether the on-line uninterruptible power system is in a line mode; and when the determination is yes, controlling the operation of a power factor correction circuit of the on-line uninterruptible power system to limit the magnitude of its input current to not exceed the first predetermined value.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments ae merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
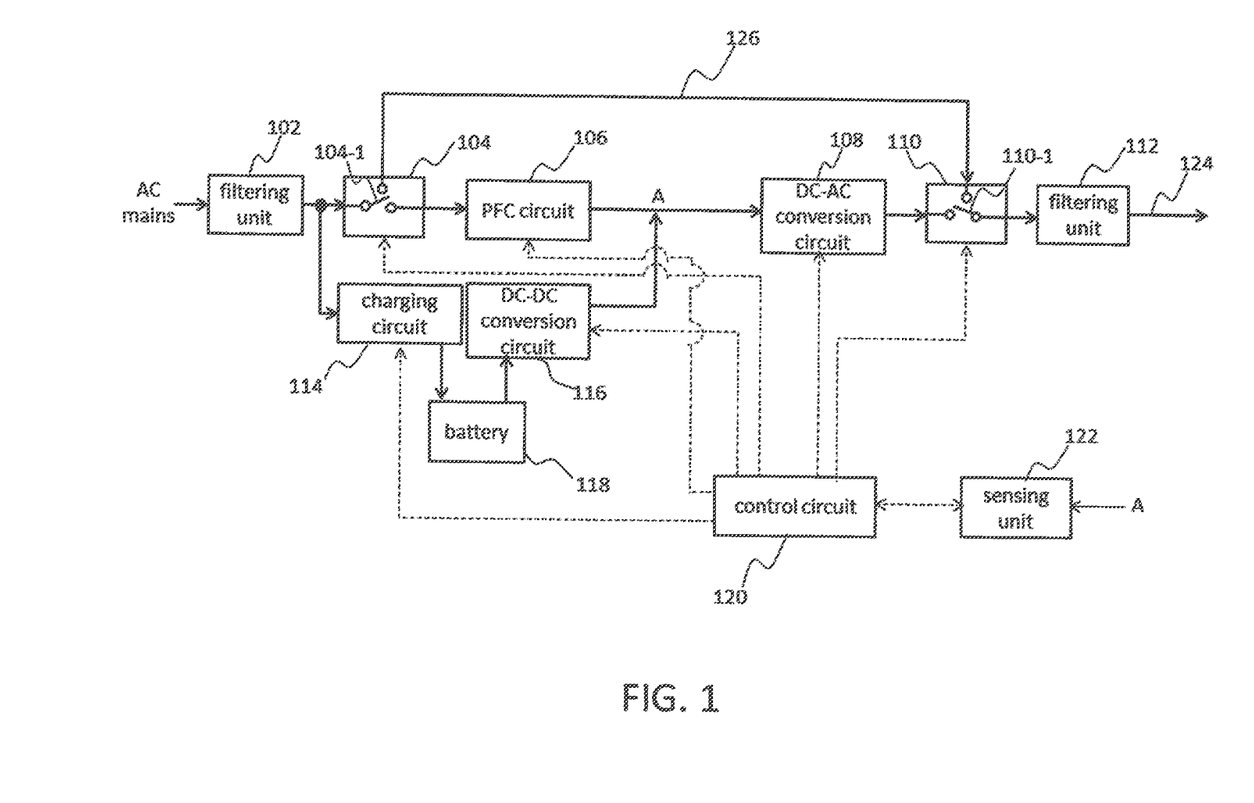
FIG. 1 shows an on-line uninterruptible power system according to an embodiment of the present invention.

FIG. 1 shows an on-line uninterruptible power system according to an embodiment of the present invention. Referring to FIG. 1, the on-line uninterruptible power system comprises a filtering unit 102, a switch unit 104, a power factor correction circuit (PFC circuit) 106, a DC-AC conversion circuit 108, a switch unit 110, a filtering unit. 112, a charging circuit 114, a DC-DC conversion circuit 116, a battery 118, a control circuit 120 and a sensing unit 122. In this embodiment, the filtering unit 102 is electrically coupled to an AC power source (such as AC mains) through a circuit breaker (not shown). The circuit breaker is, for example, a 15 Amp circuit breaker. The so-called 15 Amp circuit breaker means that the rated current value of the circuit breaker is 15 Amps. When the current flowing through the circuit breaker exceeds the rated current value of the circuit breaker, the circuit breaker will trip. Furthermore, in this embodiment, the output terminal 124 of the on-line uninterruptible power system is electrically coupled to at least an electrical device (for example, electrically coupled to laser printers, not shown) to provide AC output to these electrical devices.

The switch unit 104 is electrically coupled to the filtering unit 102, an input terminal of the power factor correction circuit 106, and a terminal of the bypass path 126. In this embodiment, the switch unit 104 is implemented by a switch 104-1. As shown in FIG. 1, a first terminal, a second terminal, and a third terminal of the switch 104-1 are electrically coupled to the filtering unit 102, the input terminal of the power factor correction circuit 106, and a terminal of the bypass path 126, respectively. An input terminal of the DC-AC conversion circuit 108 is electrically coupled to an output terminal of the power factor correction circuit 106. The switch unit 110 is electrically coupled to an output terminal of the DC-AC conversion circuit 108 and the other terminal of the bypass path 126, and is electrically coupled to the output terminal 124 of the on-line uninterruptible power system through the filtering unit 112. In this embodiment, the switch unit 110 is implemented by a switch 110-1. As shown in FIG. 1, a first terminal, a second terminal, and a third terminal of the switch 110-1 are electrically coupled to the output terminal of the DC-AC conversion circuit 108, the filtering unit 112, and the other terminal of the bypass path 126, respectively. Although in this embodiment each of the switch units 104 and 110 is implemented by a switch, this is not intended to limit the present invention. Those of ordinary skill in the art should know that each of the switch units 104 and 110 may comprise at least one switch.

An input terminal of the charging circuit 114 is electrically coupled to an output terminal of the filtering unit 102, and an output terminal of the charging circuit 114 is electrically coupled to the battery 118. The battery 118 can be disposed inside or outside the casing of the on-line uninterruptible power system, which is not limited in the present invention. An input terminal of the DC-DC conversion circuit 116 is electrically coupled to the battery 118, and an output terminal of the DC-DC conversion circuit 116 is electrically coupled to the input terminal of the DC-AC conversion circuit 108. The control circuit 120 is electrically coupled to the switch unit 104, the power factor correction circuit 106, the DC-AC conversion circuit 108, the switch unit 110, the charging circuit 114, the DC-DC conversion circuit 116, and the sensing unit 122 to control their operations. For example, the control circuit 120 can control the operation of the switch unit 104, so as to electrically couple the filtering unit 102 with the bypass path 126 by the switch unit 104, or to electrically couple the filtering unit 102 with the power factor correction circuit 106 by the switch unit 104. For another example, the control circuit 120 can control the operation of the switch unit 110, so as to electrically couple the filtering unit 112 with the bypass path 126 by the switch unit 110, or to electrically couple the filtering unit 112 with the DC-AC conversion circuit 108 by the switch unit 110. In addition, the sensing unit 122 is electrically coupled to the input terminal of the DC-AC conversion circuit 108 so that the control circuit 120 senses a voltage A at the input terminal of the DC-AC conversion circuit 108 through the sensing unit 122.

Next, the differences in operation between the conventional on-line uninterruptible power system and the on-line uninterruptible power system shown in FIG. 1 will be explained. Generally speaking, the conventional on-line uninterruptible power system has three different operation modes: line mode, battery mode and bypass mode. When the conventional on-line uninterruptible power system is in the line mode, the control circuit of the conventional on-line uninterruptible power system enables the power factor correction circuit and the DC-AC conversion circuit, and disables the DC-DC conversion circuit. In addition, the control circuit of the conventional on-line uninterruptible power system also controls the operation of a first switch unit, so as to electrically couple the input terminal of the power factor correction circuit with a first filtering unit by the first switch unit. Thus, the input terminal of the power factor correction circuit can be electrically coupled to an AC power source (such as AC mains) through the first filtering unit. At the same time, the control circuit of the conventional on-line uninterruptible power system also controls the operation of a second switch unit, so as to electrically couple the output terminal of the DC-AC conversion circuit with a second filtering unit by the second switch unit. Thus, the output terminal of the DC-AC conversion circuit can be electrically coupled to the output terminal of the conventional on-line uninterruptible power system through the second filtering unit.

Similarly, when the on-line uninterruptible power system shown in FIG. 1 is in the line mode, the control circuit 120 enables the power factor correction circuit 106 and the DC-AC conversion circuit 108, controls the operation of the switch unit 104 to electrically couple the input terminal of the power factor correction circuit 106 with the filtering unit 102 by the switch unit 104, and controls the operation of the switch unit 110 to electrically couple the output terminal of the DC-AC conversion circuit 108 with the filtering unit 112 by the switch unit 110. However, one of the differences is that when this on-line uninterruptible power system is in the line mode, the control circuit 120 further controls the operation of the power factor correction circuit 106 to limit the magnitude of its input current to not exceed a first predetermined value. In this embodiment, the first predetermined value is equal to the rated current value of the aforementioned circuit breaker (i.e., 15 Amps). Another one of the difference is that when this on-line uninterruptible power system is in the line mode, the control circuit 120 further determines whether the voltage A at the input terminal of the DC-AC conversion circuit 108 is lower than a second predetermined value (for example, 180V). When the determination is yes, the control circuit 120 enables the DC-DC conversion circuit 116.

Let us take a practical example. When the on-line uninterruptible power system shown in FIG. 1 is in the line mode, once the electrical devices (such as laser printers) electrically coupled to the on-line uninterruptible power system are performing an important task (such as printing ballots) at the same time and therefore draw high current (for example, 16 Amps) instantaneously, it will cause the voltage A at the input terminal of the DC-AC conversion circuit 108 to suddenly drop from a normal value (for example, 190V) to a certain value (for example, 179V) lower than the second predetermined value. In this case, the control circuit 120 determines that the voltage A at the input terminal of the DC-AC conversion circuit 108 is lower than the aforementioned second predetermined value, and then enables the DC-DC conversion circuit 116, so that the DC-DC conversion circuit 116 can supply current to the DC-AC conversion circuit 108. Since at this time the control circuit 120 controls the operation of the power factor correction circuit 106 to limit the magnitude of its input current to not exceed 15 Amps, the current flowing through the aforementioned circuit breaker will not exceed the rated current value (15 Amps in this embodiment) of the circuit breaker. Thus, the aforementioned circuit breaker will not trip. In addition, since at this time the DC-DC conversion circuit 116 is also enabled, the DC-DC conversion circuit 116 and the power factor correction circuit 106 can together supply current to the DC-AC conversion circuit 108, thereby meeting the requirement of 18 Amps of high current for the aforementioned electrical devices.

It should be noted that although in this embodiment the first predetermined value is equal to the rated current value of the aforementioned circuit breaker, this is not intended to limit the present invention. Those skilled in the art should know that the first predetermined value may be less than the rated current value of the aforementioned circuit breaker. For example, the first predetermined value may be 13 Amps. In addition, it is worth mentioning that when the on-line uninterruptible power system shown in FIG. 1 is in the line mode, the control circuit 120 may also enable the charging circuit 114, so that the charging circuit 114 can charge the battery 118 at any time.

Figure 2:
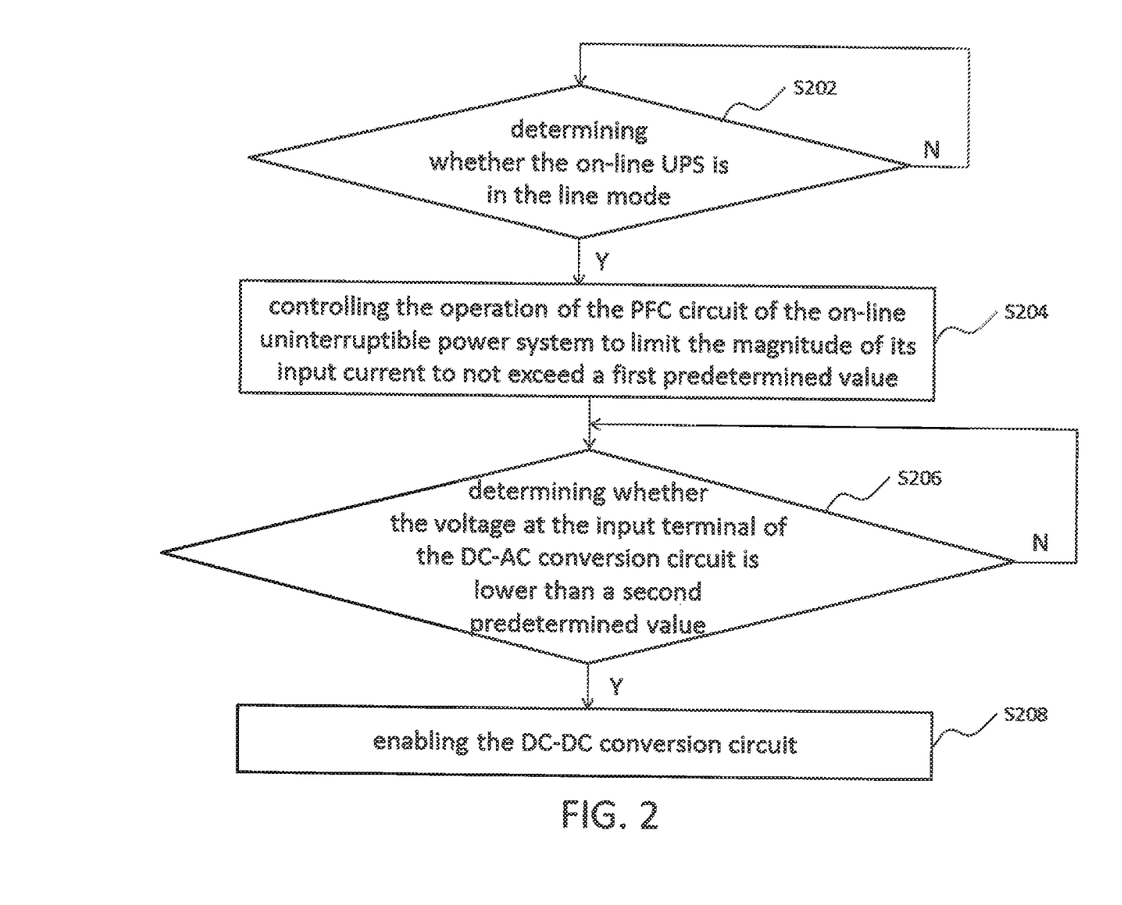
FIG. 2 is a flowchart of an operation method of the on-line uninterruptible power system shown in FIG. 1.

According to the foregoing description, those of ordinary skill in the art can conclude some basic operations of the on-line uninterruptible power system shown in FIG. 1, as shown in FIG. 2. FIG. 2 is a flowchart of an operation method of the on-line uninterruptible power system shown in FIG. 1. Referring to FIG. 2 and FIG. 1, after the on-line uninterruptible power system shown in FIG. 1 is powered on, the control circuit 120 determines whether the on-line uninterruptible power system is in the line mode (as shown in step S202). When the determination is no, the process returns to step S202. On the other hand, when the determination is yes, the control circuit 120 controls the operation of the power factor correction circuit 106 to limit the magnitude of its input current to not exceed a first predetermined value (as shown in step S204). After executing step S204, the control circuit 120 determines whether the voltage A at the input terminal of the DC-AC conversion circuit 108 is lower than a second predetermined value (as shown in step S206). When the determination is no, the process returns to step S206. On the other hand, when the determination is yes, the control circuit 120 enables the DC-DC conversion circuit 116 (as shown in step S208).

Figure 3:
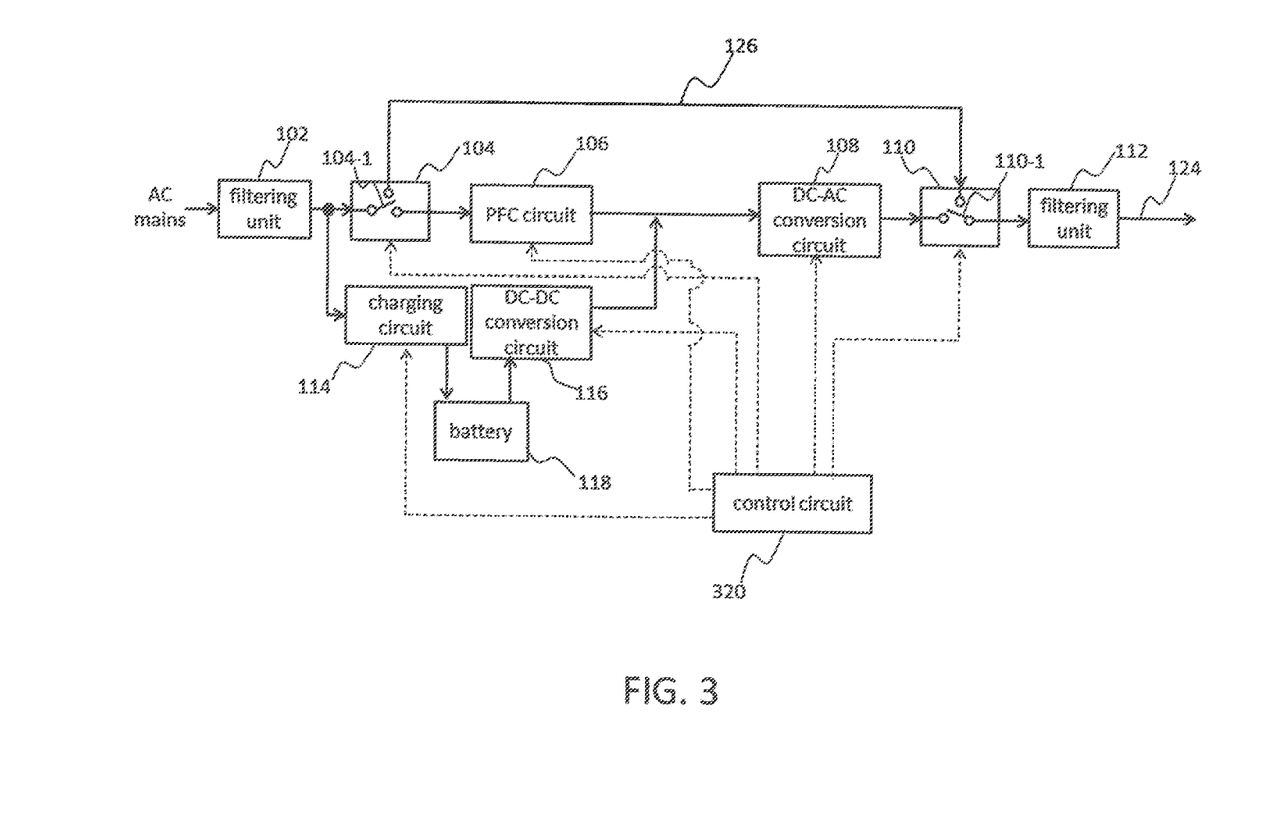
FIG. 3 shows an on-line uninterruptible power system according to another embodiment of the present invention.

FIG. 3 shows an on-line uninterruptible power system according to another embodiment of the present invention. Referring to FIG. 3, in FIG. 3 the same reference numerals as those in FIG. 1 are denoted as the same members. Compared with the on-line uninterruptible power system shown in FIG. 1, the on-line uninterruptible power system shown in FIG. 3 does not adopt the sensing unit 122. In addition, compared with the operation of the control circuit 120 shown in FIG. 1, once the control circuit 320 shown in FIG. 3 determines that the on-line uninterruptible power system is in the line mode, it will immediately enable the DC-DC conversion circuit 116. That is, when the on-line uninterruptible power system shown in FIG. 3 is in the line mode, the control circuit 320 enables the power factor correction circuit 106, the DC-AC conversion circuit 108 and the DC-DC conversion circuit 116, controls the operation of the switch unit 104 to electrically couple the input terminal of the power factor correction circuit 106 to the filtering unit 102, and controls the operation of the switch unit 110 to electrically couple the output terminal of the DC-AC conversion circuit 108 to the filtering unit 112.

In addition, when the on-line uninterruptible power system shown in FIG. 3 is in the line mode, the control circuit 320 further controls the operation of the power factor correction circuit 106 to limit the magnitude of its input current to not exceed a first predetermined value. Similarly, the first predetermined value is equal to the rated current value of a circuit breaker (not shown), or is less than the rated current value of the circuit breaker. The circuit breaker is electrically coupled between the filtering unit 102 and the AC power source shown in FIG. 3. Furthermore, in this embodiment, when the on-line uninterruptible power system is in the line mode, the control circuit 320 also enables the charging circuit 114 so that the charging circuit 114 can charge the battery 118 at any time.

In this embodiment, the output voltage of the DC-DC conversion circuit 116 can be set in two ways. The first setting is to make the output voltage of the DC-DC conversion circuit 116 equal the output voltage of the power factor correction circuit 106, and the second setting is to make the output voltage of the DC-DC conversion circuit 116 less than the output voltage of the power factor correction circuit 106. Furthermore, in this embodiment, the control circuit 320 may control the operation of the DC-DC conversion circuit 116 to make it comply with the second setting. Certainly, the DC-DC conversion circuit 116 may be directly designed to comply with the second setting.

When the on-line uninterruptible power system shown in FIG. 3 is in the line mode, no matter the on-line uninterruptible power system adopts the foregoing first setting or the second setting, once the electrical devices electrically coupled to the on-line uninterruptible power system draw high current instantaneously and the magnitude of the drawn current exceeds the first predetermined value, the DC-DC conversion circuit 116 and the power factor correction circuit 106 simultaneously provide current to the DC-AC conversion circuit 108, thereby meeting the demand for the high current required by the electrical devices. Since at this time the control circuit 320 controls the operation of the power factor correction circuit 106 to limit the magnitude of its input current to not exceed the first predetermined value, the current flowing through the aforementioned circuit breaker will not exceed the rated current of the circuit breaker. Thus, the circuit breaker will not trip.

Compared with the first setting, the second setting has the advantage that when the on-line uninterruptible power system shown in FIG. 3 is in the line mode and the current drawn by the electrical devices electrically coupled to the on-line uninterruptible power system does not exceed the first predetermined value, the power factor correction circuit 106 will provide current to the DC-AC conversion circuit 108, but the DC-DC conversion circuit 116 will not provide current to the DC-AC conversion circuit 108. Therefore, it is possible to prevent the battery 118 from consuming its stored energy at this time. In contrast, if the on-line uninterruptible power system shown in FIG. 3 adopts the first setting, the power factor correction circuit 106 and the DC-DC conversion circuit 116 will compete for output at this time. Thus, the following three situations may occur. The first case is that only the power factor correction circuit 106 provides current to the DC-AC conversion circuit 108. The second case is that only the DC-DC conversion circuit 116 provides current to the DC-AC conversion circuit 108. The third case is that both of the power factor correction circuit 106 and the DC-DC conversion circuit 116 provide current to the DC-AC conversion circuit 108 at the same time. Therefore, it is more difficult to prevent the battery 118 from consuming its stored energy at this time.

Figure 4:
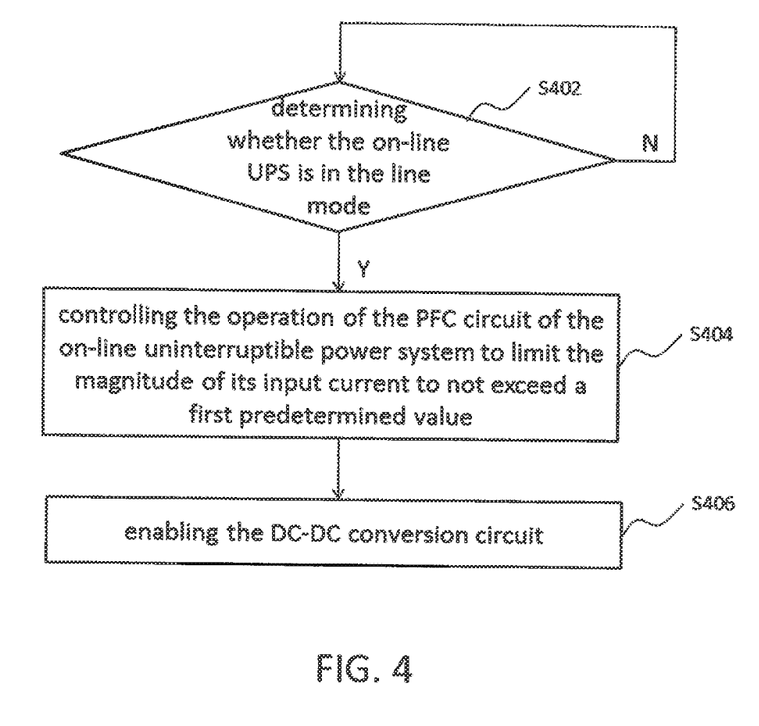
FIG. 4 is a flowchart of an operation method of the on-line uninterruptible power system shown in FIG. 3.

According to the foregoing description, those of ordinary skill in the art can conclude some basic operations of the on-line uninterruptible power system shown in FIG. 3, as shown in FIG. 4. FIG. 4 is a flowchart of an operation method of the on-line uninterruptible power system shown in FIG. 3. Referring to FIG. 4 and FIG. 3, after the on-line uninterruptible power system shown in FIG. 3 is powered on, the control circuit 320 determines whether the on-line uninterruptible power system is in the line mode (as shown in step S402). When the determination is no, the process returns to step S402. On the other hand, when the determination is yes, the control circuit 320 controls the operation of the power factor correction circuit 106 to limit the magnitude of its input current to not exceed a first predetermined value (as shown in step S404). After executing step S404, the control circuit 320 enables the DC-DC conversion circuit 116 (as shown in step S406). Certainly, in step S406, the control circuit 320 may further control the operation of the DC-DC conversion circuit 116, so as to make the output voltage of the DC-DC conversion circuit 116 less than the output voltage of the power factor correction circuit 106, and therefore comply with the second setting. It is worth mentioning that, in this embodiment, the execution order of steps S404 and S406 can be reversed.

Figure 5:
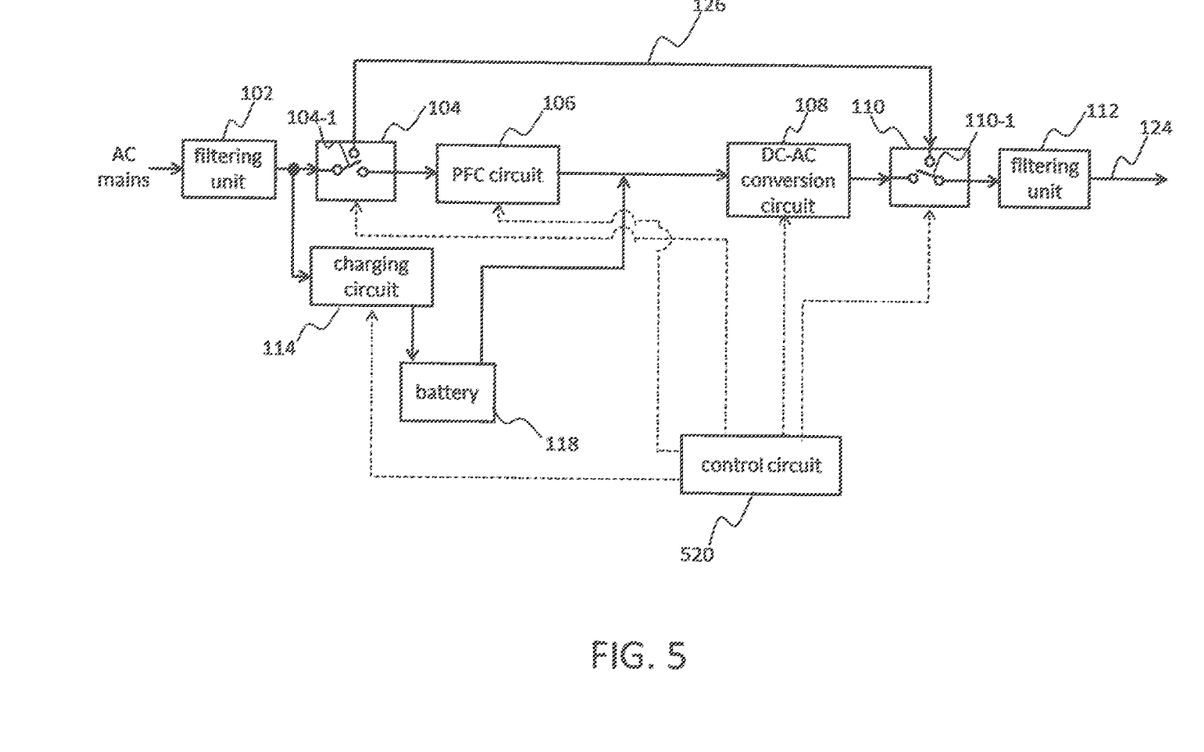
FIG. 5 shows an on-line uninterruptible power system according to still another embodiment of the present invention.

FIG. 5 shows an on-line uninterruptible power system according to still another embodiment of the present invention. Referring to FIG. 5, in FIG. 5 the same reference numerals as those in FIG. 3 are denoted as the same members. Compared with the on-line uninterruptible power system shown in FIG. 3, the on-line uninterruptible power system shown in FIG. 5 does not adopt the DC-DC conversion circuit 116. In addition, compared with the operation of the control circuit 320 shown in FIG. 3, the control circuit 520 shown in FIG. 5 does not need to control any DC-DC conversion circuit 116. Specifically, when the on-line uninterruptible power system shown in FIG. 5 is in the line mode, the control circuit 520 enables the power factor correction circuit 106 and the DC-AC conversion circuit 108, controls the operation of the switch unit 104 to electrically couple the input terminal of the power factor correction circuit 106 to the filtering unit 102, and controls the operation of the switch unit 110 to electrically couple the output terminal of the DC-AC conversion circuit 108 to the filtering unit 112.

In addition, when the on-line uninterruptible power system shown in FIG. 5 is in the line mode, the control circuit 520 further controls the operation of the power factor correction circuit 106 to limit the magnitude of its input current to not exceed a first predetermined value. Similarly, the first predetermined value is equal to the rated current value of a circuit breaker (not shown), or is less than the rated current value of the circuit breaker. The circuit breaker is electrically coupled between the filtering unit 102 and the AC power source shown in FIG. 5. Furthermore, in this embodiment, when the on-line uninterruptible power system is in the line mode, the control circuit 520 also enables the charging circuit 114 so that the charging circuit 114 can charge the battery 118 at any time.

In this embodiment, the voltage of the battery 118 fully charged can also be set in two ways. The first setting is to make the voltage of the battery 118 fully charged equal to the output voltage of the power factor correction circuit 106, and the second setting is to make the voltage of the battery 118 fully charged less than the output voltage of the power factor correction circuit 106. Furthermore, in this embodiment, the battery 118 may consist of a plurality of energy storage cells connected in series. Therefore, by changing the number of energy storage units connected in series, the voltage of the battery 118 can be changed.

When the on-line uninterruptible power system shown in FIG. 5 is in a line mode, no matter the on-line uninterruptible power system adopts the foregoing first setting or the second setting, once the electrical devices electrically coupled to the on-line uninterruptable power system draw high current instantaneously and the magnitude of the drawn current exceeds the first predetermined value, the battery 118 and the power factor correction circuit 106 simultaneously provide current to the DC-AC conversion circuit 108, thereby meeting the demand for the high current required by the electrical devices. Since at this time the control circuit 520 controls the operation of the power factor correction circuit 106 to limit the magnitude of its input current to not exceed the first predetermined value, the current flowing through the aforementioned circuit breaker will not exceed the rated current of the circuit breaker. Thus, the circuit breaker will not trip.

Compared with the first setting, the second setting has the advantage that when the on-line uninterruptible power system shown in FIG. 5 is in the line mode and the current drawn by the electrical devices electrically coupled to the on-line uninterruptible power system does not exceed the first predetermined value, the power factor correction circuit 106 will provide current to the DC-AC conversion circuit 108, but the battery 118 will not provide current to the DC-AC conversion circuit 108. Therefore, it is possible to prevent the battery 118 from consuming its stored energy at this time. In contrast, if the on-line uninterruptible power system shown in FIG. 5 adopts the first setting, the power factor correction circuit 106 and the battery 118 will compete for output at this time. Thus, the following three situations may occur. The first case is that only the power factor correction circuit 106 provides current to the DC-AC conversion circuit 108. The second case is that only the battery 118 provides current to the DC-AC conversion circuit 108. The third case is that both of the power factor correction circuit 106 and the battery 118 provide current to the DC-AC conversion circuit 108 at the same time. Therefore, it is more difficult to prevent the battery 118 from consuming its stored energy at this time.

Figure 6:
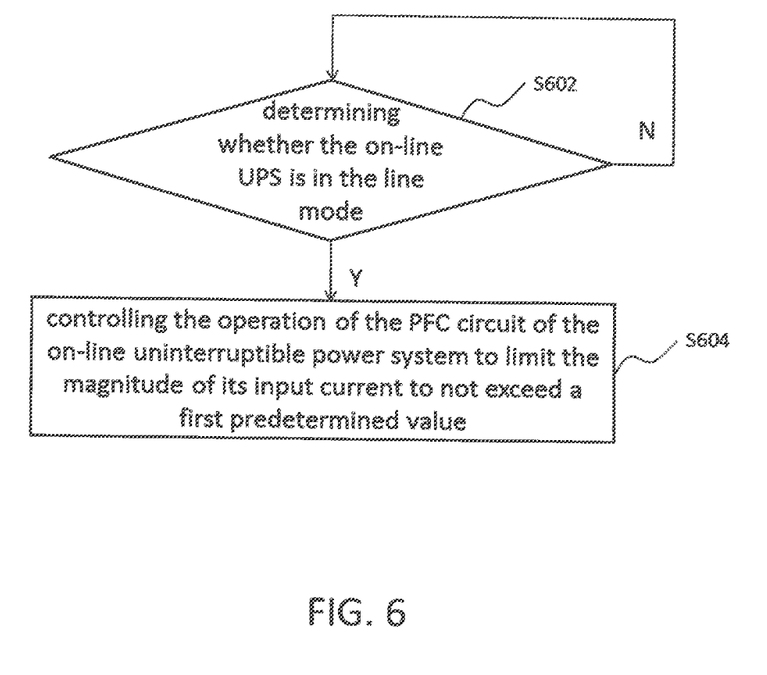
FIG. 6 is a flowchart of an operation method of the on-line uninterruptible power system shown in FIG. 5.

According to the foregoing description, those of ordinary skill in the art can conclude some basic operations of the on-line uninterruptible power system shown in FIG. 5, as shown in FIG. 6. FIG. 6 is a flowchart of an operation method of the on-line uninterruptible power system shown in FIG. 5. Referring to FIG. 6 and FIG. 5, after the on-line uninterruptible power system shown in FIG. 5 is powered on, the control circuit 520 determines whether the on-line uninterruptible power system is in the line mode (as shown in step S602). When the determination is no, the process returns to step S602. On the other hand, when the determination is yes, the control circuit 520 controls the operation of the power factor correction circuit 106 to limit the magnitude of its input current to not exceed a first predetermined value (as shown in step S604).

It is worth mentioning that, although in the foregoing embodiments, each of the on-line uninterruptible power systems employs the filtering units 102 and 112, this is not intended to limit the present invention. Those skilled in the art should know whether to adopt the filtering units 102 and 112 can be determined according to actual design requirements.

In summary, when the on-line uninterruptible power system of the present invention is in the line mode, it will control the operation of the power factor correction circuit, so as to limit the magnitude of the input current of the power factor correction circuit to not exceed the rated current of a related circuit breaker. Once the electrical devices electrically coupled to the on-line uninterruptible power system draw high current instantaneously at this time, the current flowing through the circuit breaker will not exceed the rated current of the circuit breaker. Therefore, the circuit breaker will not trip. In addition, since at this time the power factor correction circuit and the battery of the on-line uninterruptible power system provide current to the DC-AC conversion circuit at the same time, the instantaneous high-current demand required by the aforementioned electrical devices can be met.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An on-line uninterruptible power system, comprising:
   a first switch unit, electrically coupled to an AC power source and a first terminal of a bypass path;
   a second switch unit, electrically coupled to an output terminal of the on-line uninterruptible power system and a second terminal of the bypass path;
   a charging circuit, electrically coupled to the AC power source and a battery;
   a DC-AC conversion circuit, electrically coupled between the battery and the second switch unit;
   a power factor correction circuit, electrically coupled between the first switch unit and the DC-AC conversion circuit;
   a sensing unit;
   a DC-DC conversion circuit, electrically coupled between the battery and the DC-AC conversion circuit; and
   a control circuit, electrically coupled to the first switch unit, the second switch unit, the power factor correction circuit, the DC-AC conversion circuit, the charging circuit, the DC-DC conversion circuit, the sensing unit, and an input terminal of the DC-AC conversion circuit through the sensing unit,
   wherein when the on-line uninterruptible power system is in a line mode, the control circuit controls the operation of the power factor correction circuit to limit the magnitude of its input current to not exceed a first predetermined value, and
   wherein, the control circuit senses a voltage at the input terminal through the sensing unit, and when the on-line uninterruptible power system is in the line mode, the control circuit further determines whether the voltage at the input terminal is lower than a second predetermined value, and enables the DC-DC conversion circuit when the determination is yes.

2. The on-line uninterruptible power system as claimed in claim 1, wherein the first predetermined value is equal to a rated current value of a circuit breaker, and the on-line uninterruptible power system is electrically coupled to the AC power source through the circuit breaker.

3. The on-line uninterruptible power system as claimed in claim 1, wherein the first predetermined value is less than a rated current value of a circuit breaker, and the on-line uninterruptible power system is electrically coupled to the AC power source through the circuit breaker.

4. The on-line uninterruptible power system as claimed in claim 1, wherein each of the first switch unit and the second switch unit comprises at least a switch.

5. The on-line uninterruptible power system as claimed in claim 1, further comprising a first filtering unit and a second filtering unit, wherein the first switch unit is electrically coupled to the AC power source through the first filtering unit, and the second switch unit is electrically coupled to the output terminal of the on-line uninterruptible power system through the second filtering unit.

6. An operation method of an on-line uninterruptible power system, comprising the following steps:
   determining whether the on-line uninterruptible power system is in a line mode;
   when the determination is yes, controlling operation of a power factor correction circuit of the on-line uninterruptible power system to limit a magnitude of its input current to not exceed a first predetermined value, and
   determining whether a voltage at an input terminal of a DC-AC conversion circuit of the on-line uninterruptible power system is lower than a second predetermined value, and enabling a DC-DC conversion circuit of the on-line uninterruptible power system when the voltage is lower than the second predetermined value.

* * * * *